US008167267B2

(12) United States Patent
Artru (10) Patent No.: US 8,167,267 B2
(45) Date of Patent: May 1, 2012

(54) FAUCET WITH SPHERICAL ROTATING CLOSURE

(75) Inventor: Patrick Artru, Peaugres (FR)

(73) Assignee: Vanatome (FR)

( * ) Notice: Subject to any disclaimer, the term of this patent is extended or adjusted under 35 U.S.C. 154(b) by 904 days.

(21) Appl. No.: 12/088,801

(22) PCT Filed: Sep. 25, 2006

(86) PCT No.: PCT/FR2006/002182
§ 371 (c)(1),
(2), (4) Date: Sep. 9, 2008

(87) PCT Pub. No.: WO2007/036629
PCT Pub. Date: Apr. 5, 2007

(65) Prior Publication Data
US 2009/0050833 A1  Feb. 26, 2009

(30) Foreign Application Priority Data

Sep. 29, 2005  (FR) ..................................... 05 09949

(51) Int. Cl.
*F16K 31/44* (2006.01)
(52) U.S. Cl. .......... 251/160; 251/172; 251/175; 251/297
(58) Field of Classification Search .................. 251/160, 251/172, 175, 177, 283, 297, 315.16
See application file for complete search history.

(56) References Cited

U.S. PATENT DOCUMENTS

| 3,047,265 | A | * | 7/1962 | Kaiser | 251/172 |
| 3,565,392 | A | * | 2/1971 | Bryant et al. | 251/159 |
| 3,737,145 | A | * | 6/1973 | Heller et al. | 251/309 |
| 3,912,220 | A | * | 10/1975 | Vasicek et al. | 251/159 |
| 4,575,045 | A | * | 3/1986 | Martin et al. | 251/172 |
| 4,928,921 | A | * | 5/1990 | Steele | 251/175 |
| 5,169,123 | A | * | 12/1992 | Martin et al. | 251/177 |
| 5,494,256 | A | * | 2/1996 | Beson | 251/172 |
| 2004/0178381 | A1 | * | 9/2004 | Sundararajan | 251/175 |

FOREIGN PATENT DOCUMENTS

JP   64-15575   *   1/1989

OTHER PUBLICATIONS

International Search Report PCT/FR2006/002182 Dated Dec. 3, 2007.

* cited by examiner

*Primary Examiner* — Eric Keasel
*Assistant Examiner* — R. K. Arundale
(74) *Attorney, Agent, or Firm* — Cantor Colburn LLP (57) ABSTRACT

A faucet including: a body having an axis channel; a spherical rotating closure mounted pivotable in the body, between a closed position and an open position, the closure including a through orifice allowing the passage of a fluid from an upstream pipe to a downstream pipe, in open position; an upstream seat having a central passage, mounted in the channel of the body upstream of the closure so as to be mobile in translation along the axis and urged towards the closure by elastic means; a protuberance provided in the upstream seat projecting towards the closure, and a recess provided on the closure, to co-operate with the protuberance in closed position of the closure; and means for equalizing the pressure between upstream and downstream of the upstream seat, prior to the faucet being opened.

10 Claims, 6 Drawing Sheets

FAUCET WITH SPHERICAL ROTATING CLOSURE

TECHNICAL FIELD OF THE INVENTION

The present invention relates to a valve with a spherical rotating plug.

BRIEF DISCUSSION OF RELATED ART

Such a valve conventionally comprises a body in which a channel is formed, and also a spherical plug which, mounted in the body such that it can pivot about an axis perpendicular to the axis of the channel, has a through orifice allowing the passage of fluid between an upstream pipe and a downstream pipe, in the open position. Furthermore, an upstream seat is generally mounted in the channel of the body, upstream of the plug, such that it can move translationally along the axis of the channel of the body. The upstream seat is intended to ensure that the valve is leaktight in the closed position, by being pressed against the plug.

On the one hand, valves used at high pressures are known, as illustrated in documents FR 2 564 558 and FR 2 646 488. In that case, most of the bearing force of the upstream seat against the plug results from the pressure exerted by the fluid upstream. To prevent the plug engaging frictionally against the upstream seat when rotating the plug, and thus to make it easier to open the valve, these documents provide means for equalizing the pressure on either side of the upstream seat, prior to the valve being opened. Furthermore, the valves described in these documents may include springs which tend to move the upstream seat away from the plug. The force of these springs is countered by the high pressure of the fluid when the valve is in the closed and leaktight position, but after the pressures between the upstream end and the downstream end of the upstream seat have been equalized, these springs allow a retreating movement of the upstream seat with respect to the plug.

However, these valves are not suited for uses at low or medium pressures since, in that case, the pressing action of the upstream seat against the plug, resulting from the upstream pipe pressure alone, is insufficient to ensure satisfactory leaktightness of the valve in the closed position. The provision of this leaktightness is also impeded by the presence of the springs which tend to move the upstream seat away from the plug.

On the other had, valves used at low or medium pressures are known. In such a valve, illustrated for example in document JP 01 015575, it is necessary to provide elastic means which urge the upstream seat toward the plug and press it against the latter, so as to provide satisfactory leaktightness in the absence of a sufficient fluid pressure upstream. On opening, the upstream seat remains pressed against the plug by the elastic means. Document JP 01 015575 makes provision to equip the upstream seat with rollers cooperating with recesses formed in the plug. Consequently, the friction between the upstream seat and the plug is limited, and the valve can be opened more easily as a result. In this way the valve is prevented from jamming, or even from being damaged.

However, the valve proposed by document JP 01 015575 would not be able to operate at high pressures. Specifically, in that case, the force exerted by the upstream fluid would be so high that the pressing action of the upstream seat against the plug would prevent the plug from turning, this being so even with rollers having been provided.

BRIEF SUMMARY OF THE INVENTION

The present invention aims to overcome the drawbacks mentioned above by providing a valve which can be used throughout the whole range of pressures (low, medium and high pressures) and which has improved leaktightness, while at the same time being easy to operate without the risk of jamming.

Accordingly, the invention relates to a valve comprising:
- a body in which there is formed a channel with an axis and which is intended to be placed between an upstream pipe and a downstream pipe;
- a substantially spherical rotating plug mounted in the body such that it can pivot about an axis substantially perpendicular to the axis of the channel, between a closed position and an open position, the plug having a through orifice with an axis that is intended to allow the passage of fluid from the upstream pipe to the downstream pipe in the open position;
- an upstream seat having a central passage and mounted in the channel of the body upstream of the plug such that it can move translationally along the axis of the channel of the body;
- elastic means designed to urge the upstream seat toward the plug;
- at least one projection formed on the upstream seat and projecting substantially parallel to the axis of the channel of the body in the direction of the plug, and at least one first recess formed in the plug and designed to cooperate with the projection when the plug is in the closed position; and additionally comprising means for equalizing the fluid pressure between the upstream end and the downstream end of the upstream seat, prior to the valve being opened.

Thus, in the closed position, the upstream seat is in its most downstream position since the projection is housed in the recess. Leaktightness is ensured by the action of the elastic means and by the pressure of the upstream fluid (the relative size of these two forces depending on the pressure at which the valve is used), which tend to press the upstream seat against the plug.

When the plug is pivoted toward its open position, first of all the pressures between the upstream end and the downstream end of the seat are equalized. Thus, the force needed to press the upstream seat against the plug now results only from the force of the elastic means. When the pivoting of the plug is continued, the projection leaves the recess, causing the upstream seat to retreat with respect to the plug, that is to say to be moved upstream. Consequently, the friction between the upstream seat and the plug is very limited and the valve can be opened more easily as a result.

The projection may be formed by a roller rotatably mounted about an axis embodied by a pin secured to the upstream seat and substantially parallel to the pivoting axis of the plug, and/or be formed on a ring fastened to the downstream part of the upstream seat such that it is substantially centered on the axis of the channel of the body. In a variant, the upstream seat itself forms a ring.

Advantageously, the plug comprises a second recess situated substantially at the same distance as the first recess from the plane which is orthogonal to the pivoting axis of the plug and which passes through the axis of the through orifice, said second recess being designed to cooperate with the projection when the plug is in the open position. Thus, in the open position, the upstream seat is in its most downstream position since the projection is housed in the recess.

According to one possible embodiment, the plug has at least two assemblies each comprising a first recess or first and second recesses, the two assemblies being substantially symmetrical to one another with respect to the plane which is orthogonal to the pivoting axis of the plug and which passes through the axis of the through orifice, and the upstream seat has two projections which are substantially symmetrical with respect to the axis of the channel of the body and situated along a line substantially parallel to the pivoting axis of the plug, such that each projection can cooperate with the recess or recesses of one of the two assemblies. This symmetrical arrangement makes it possible for the upstream seat to retreat parallel to the axis of the channel of the body while preventing the upstream seat from being set "crossways" in this channel, which could result in the occurrence of friction on the plug as this plug is being pivoted.

Furthermore, the plug may comprise at least two assemblies each comprising a first recess or first and second recesses, the two assemblies being substantially symmetrical to one another with respect to the pivoting axis of the plug. This makes it possible to obtain a "bidirectional" valve, the recesses of one assembly cooperating with a projection formed on the downstream seat.

The plug may thus comprise four assemblies consisting of one or two recesses each (on the upstream side/on the downstream side and on either side of the axis of the channel of the body). Advantageously, the upstream seat comprises a plurality of successive annular portions from the upstream end toward the downstream end, the dimensions of which are chosen such that, owing to the fluid pressure upstream and downstream of the upstream seat:
- when the pressure-equalizing means are in the closed position, the upstream seat is pressed against the plug, thus ensuring that the valve is leaktight;
- when the pressure-equalizing means are in the open position, a thrust force counter to the elastic means is exerted on the upstream seat.

The means for equalizing the fluid pressure between the upstream end and the downstream end of the upstream seat comprise, for example:
- an upstream annular chamber whose downstream wall is formed by a shoulder formed on the upstream seat and facing upstream, and a downstream annular chamber situated between the upstream seat and the plug, not communicating with the central passage of the upstream seat when the valve is in the closed and leaktight position;
- a duct that is formed in the body and has a first portion connected to the upstream annular chamber by a channel and a second portion in communication with the downstream annular chamber;
- means for obstructing the passage between the first and second portions of the duct, which means are housed in said duct and can move translationally along the axis of the duct, said obstruction means being urged toward the closure position of said passage by elastic means and having a bearing face which, in the closure position of said passage, is situated outside the duct, in the region of the second portion thereof;
- a cam which, formed on the body between said obstruction means and a spindle which actuates the pivoting movement of the plug and is substantially coaxial with the pivoting axis of said plug, is able, when said actuating spindle is rotated, to cooperate with the bearing face and thus cause the obstruction means to move in the duct, counter to the force exerted by the elastic means and the pressure, toward a position of releasing the passage between the first and second portions of the duct.

According to one possible embodiment, the axis of the duct is substantially orthogonal to the pivoting axis of the plug, and the cam comprises a part situated opposite the bearing face of the obstruction means, a first end of which is fastened to the body of the valve (or to the cap secured to the body) such that it can pivot about an axis substantially parallel to the pivoting axis of the plug, and a second end of which has a projection projecting toward the actuating spindle of the plug, said projection being designed to cooperate, when the valve is in the closed and leaktight position, with a cavity formed in the actuating spindle.

BRIEF DESCRIPTION OF THE DRAWINGS

One possible embodiment of the invention will now be described by way of nonlimiting example with reference to the appended figures.

DETAILED DESCRIPTION OF THE INVENTION

Figure 1:
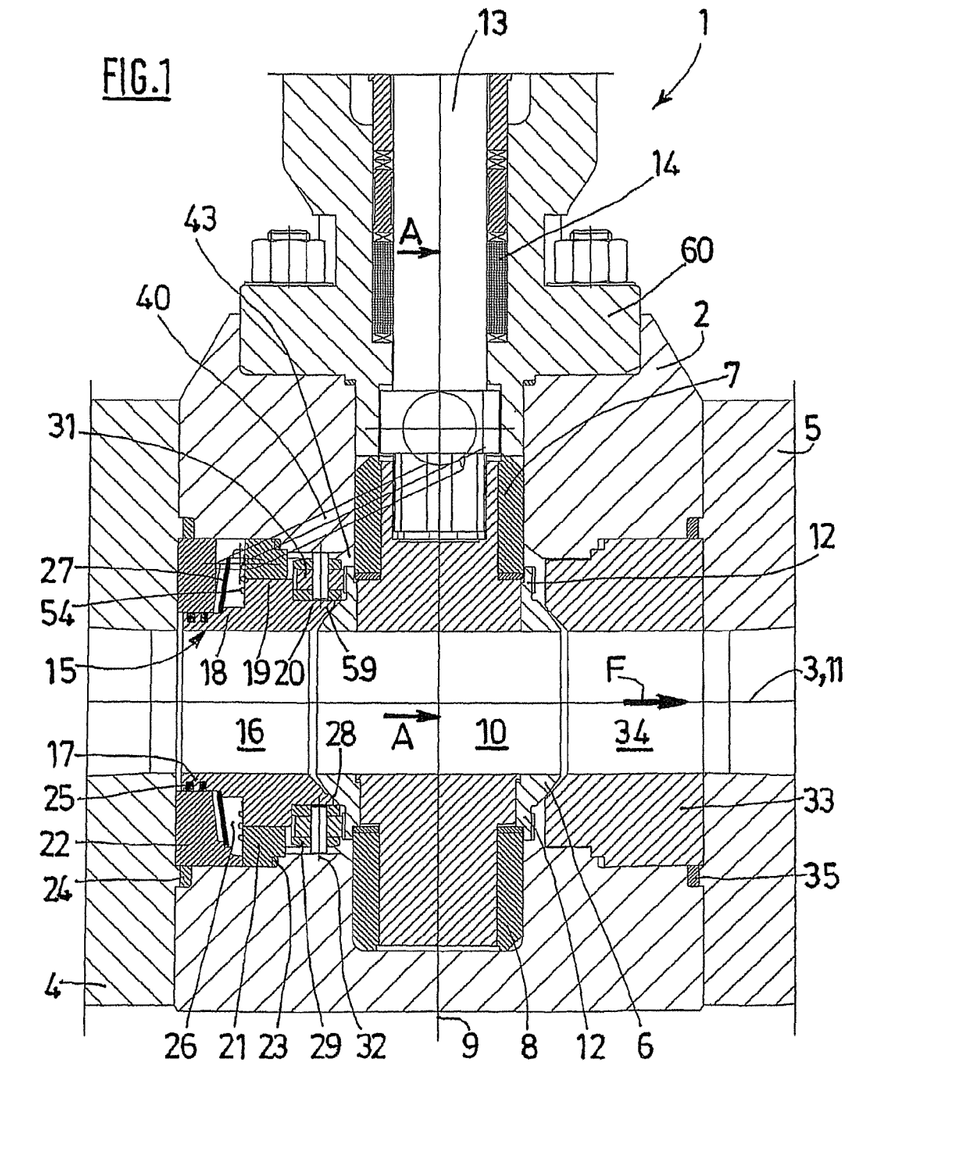
FIG. 1 is a part view in longitudinal section of a valve according to the invention, in the open position.

FIG. 1 represents a valve 1 comprising a body 2 in which there is formed a channel with an axis 3. The body 2 is intended to be connected to an upstream pipe by means of an upstream flange 4 and to a downstream pipe by means of a downstream flange 5. The fluid conveyed by the pipes flows in the direction indicated by the arrow F, the terms "upstream" and "downstream" being defined with respect to this direction.

Other body variants are possible, particularly a version in which the body is directly connected to the upstream and downstream pipes without the use of flanges. The internal elements are then mounted and demounted from the top of the body.

The valve 1 also comprises a rotating plug 6 mounted in the body 2, via bearings 7, 8, such that it can pivot about an axis 9 substantially perpendicular to the axis 3. The plug 6 features a main spherical part having a cylindrical through orifice 10 with an axis 11, the axis 11 being situated in the plane which is orthogonal to the pivoting axis 9 of the plug 6 and which passes through the axis 3 of the channel of the body 2. The main spherical part of the plug 6 is extended by two cylindrical parts 12 whose axis is substantially coincident with the pivoting axis 9 of the plug 6, each extending on one side of the main spherical part.

The plug 6 is assigned an actuating spindle 13, substantially coaxial with the pivoting axis 9, which passes through the body 2 via interposed gland packings 14. The actuating spindle 13 is extended by an external lever (not shown) which allows a user to move the plug 6 between:

an open position, in which the axis 11 of the orifice 10 and the axis 3 of the channel of the body are substantially coincident, the fluid then being able to flow from upstream to downstream;

and a closed position, in which the axis 11 of the orifice 10 forms an angle α of around 70° to 80°, for example 80°, with the axis 3 of the channel of the body. Of course, the plug 6 is dimensioned so that, in this position, the fluid cannot pass from upstream to downstream.

In each of the cylindrical parts 12 extending the main spherical part of the plug 6 are formed four substantially identical recesses situated substantially at the same distance from the plane which is orthogonal to the pivoting axis 9 of the plug 6 and which passes through the axis 11 of the through orifice 10:

a first recess 55 offset angularly from the axis 11 of the through orifice 10 by an angle α of around 70° to 80°, for example 80°, in a direction such that, when the plug 6 is in the closed position, the first recess 55 is oriented in the upstream direction;

a second recess 56 situated substantially in the plane formed by the pivoting axis 9 of the plug 6 and the axis 11 of the through orifice 10;

a third recess 57 substantially symmetrical to the first recess 55 with respect to the pivoting axis 9 of the plug 6; and a fourth recess 58 substantially symmetrical to the second recess 56 with respect to the pivoting axis 9 of the plug 6.

The recesses have, for example, a semicylindrical shape whose axis is substantially parallel to the pivoting axis 9 of the plug 6. Moreover, the four recesses formed in one of the cylindrical parts 12 and the four recesses formed in the other of the cylindrical parts 12 are substantially symmetrical to one another with respect to the plane which is orthogonal to the pivoting axis 9 of the plug 6 and which passes through the axis 11 of the through orifice 10 of the plug 6.

An upstream seat 15 having a central passage 16 is mounted substantially coaxially in the channel of the body 2, upstream of the plug 6, such that it can move translationally along the axis 3 to a limited extent.

From upstream to downstream, the upstream seat 15 has a first annular portion 17, a second annular portion 18 of larger outside diameter, defining a stop surface, a third annular portion 19 of even larger outside diameter, and then a fourth annular portion 20 whose outside diameter is smaller than that of the third annular portion 19. These four annular portions substantially have the same inside diameter, such that the central passage 16 is substantially cylindrical.

The upstream seat 15 finally has, most downstream, a fifth annular portion 59 (defining the sealing surface of the upstream seat 15), the outside diameter of which is smaller than the outside diameter of the third annular portion 19 (and here substantially equal to the outside diameter of the fourth annular portion 20), and the inside diameter of which is larger than the outside diameter of the first annular portion 17. The advantage in selecting these dimensions is explained below.

The upstream seat 15 is mounted in the body 2 by means of an annular guide element 21, placed between the third annular portion 19 and the body 2, and an annular closure element 22 placed between the first annular portion 17 and the body 2. Seals 23, 24 are interposed between the body 2 and the guide element 21 and between the body 2 and the closure element 22, respectively. Furthermore, rings 25 are placed between the closure element 22 and the upstream seat 15, a slight radial clearance being formed between these two parts.

Between the closure element 22, the guide element 21 and the upstream seat 15 is defined an upstream annular chamber 26 which is in limited fluid communication with the central passage 16 of the upstream seat 15 via the rings 25 and the radial clearance mentioned above. In the upstream annular chamber 26 is placed a spring washer 27 bearing, on the one hand, on the stop surface formed between the first and second annular portions 17, 18 of the upstream seat 15 and, on the other hand, on a stop surface formed on the closure element 22. The washer 27 thus urges the upstream seat 15 toward the plug 6, the effect of which is to press the downstream end 28 of the upstream seat 15 against the plug 6 and, consequently, ensure that the valve 1 is leaktight when the plug 6 is in the closed position. A metal diaphragm 54 is, furthermore, arranged in the upstream annular chamber 26 against the downstream face of this chamber, one end of the diaphragm 54 being fastened to the guide element 21 and the other end being fastened to the upstream seat 15. The diaphragm 54 provides leaktightness between the upstream seat 15 and the body 2 when the valve is in the closed and leaktight position.

Figure 2:
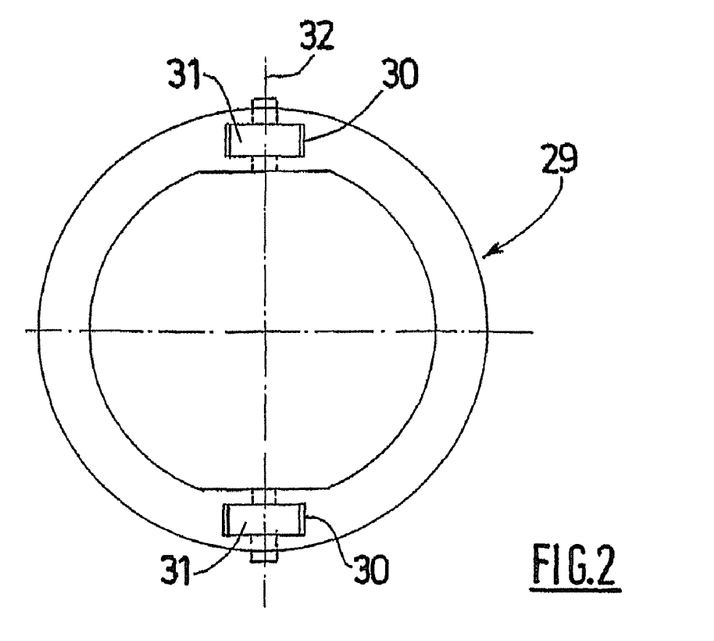
FIG. 2 is a front view of the ring bearing the rollers and mounted on the upstream seat of the valve shown in FIG. 1.

A ring 29 is mounted on the fourth annular portion 20 of the upstream seat 15, in the channel of the body 2. The ring 29, illustrated in FIG. 2, comprises two diametrically opposed, substantially parallelepipedal housings 30 in each of which is mounted a roller 31 such that it can rotate about a common axis 32 substantially joining the centers of the two housings 30. The ring 29 is mounted on the upstream seat 15 such that the axis 32 is substantially parallel to the pivoting axis 9 of the plug 6 and intersects the axis 3 of the channel of the body 2. The rollers 31 are thus arranged each opposite a cylindrical part 12 of the plug 6, at the same axial level as the recesses 55, 56, 57, 58, and project toward the plug 6 with respect to the downstream end 28 of the upstream seat 15.

Furthermore, a false downstream seat 33 having a central passage 34 is mounted inside the channel of the body 2, on the downstream side of the plug 6, with an interposed seal 35 in order to provide continuity between the central passage 16, the orifice 10 and the central passage 34. In a variant, the false downstream seat 33 could have a similar structure to the upstream seat 15, in particular for using the valve 1 in both directions of fluid flow (direction of the arrow F and opposite direction). In the case of a bidirectional valve, each of the two "upstream" and "downstream" seats is preferably equipped, in addition to the diaphragm 54, with a counter-diaphragm which comes into play, during the equalizing phases, to protect the diaphragm associated with the seat on the "downstream" side against the reverse pressure effect, which could not be borne by a single diaphragm.

When the valve 1 is in the open position, the upstream fluid flow path, the central passage 16 of the upstream seat 15, the through orifice 10 of the plug 6, the central passage 34 of the false downstream seat 33 and the downstream fluid flow path are substantially coaxial and have similar cross sections.

Figure 3:
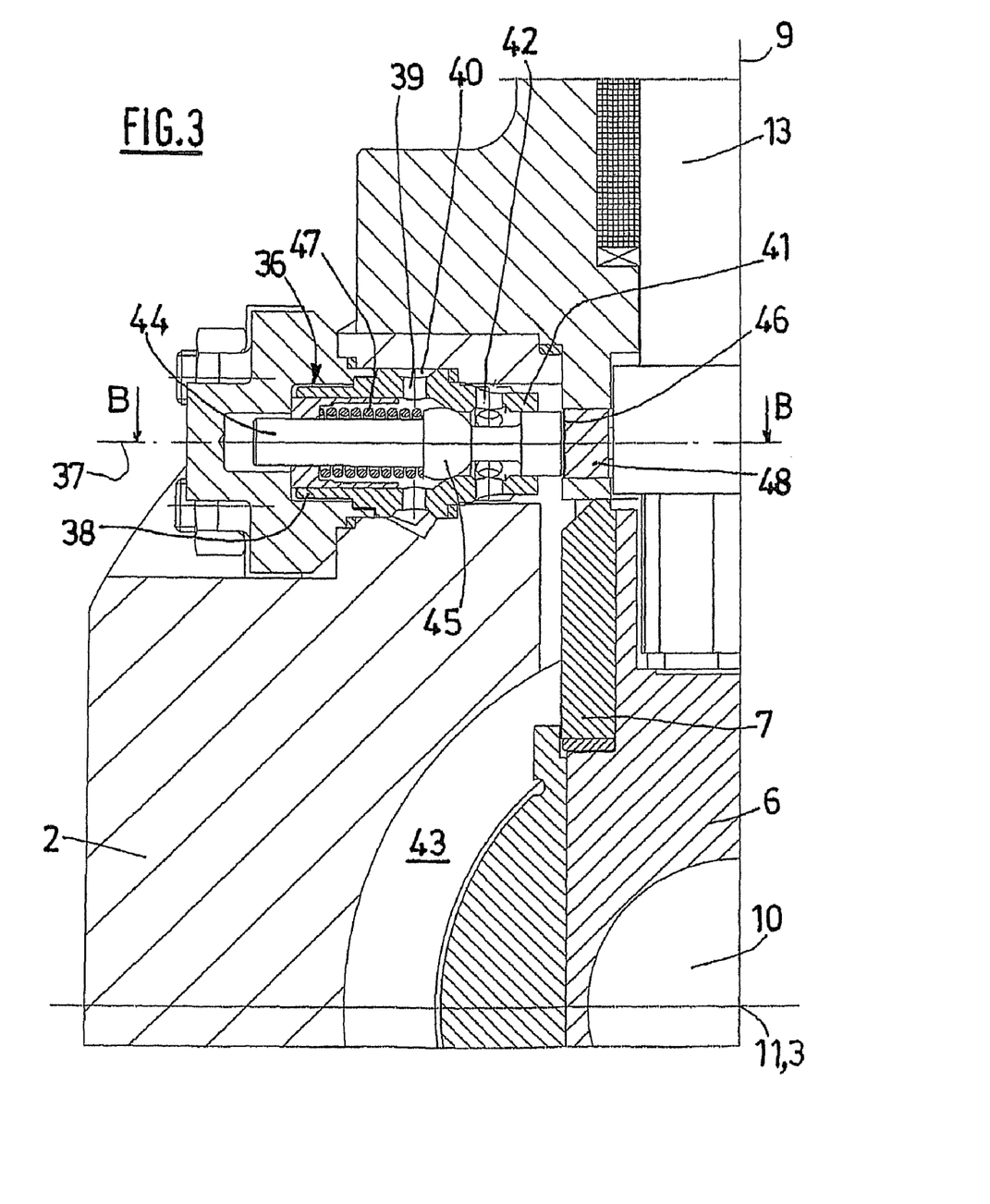
FIG. 3 is a view in section of the valve, taken on line AA of FIG. 1, showing the means of equalizing the fluid pressure.

Finally, as illustrated in FIGS. 1 and 3, the valve 1 comprises means for equalizing the pressure between the upstream end and the downstream end of the upstream seat 15, prior to the valve 1 being opened, these means forming a bypass circuit.

The equalizing means comprise first of all a cylindrical duct 36, with an axis 37, formed in the body 2 substantially orthogonally to the pivoting axis 9 of the plug 6 and to the axis 3 of the channel of the body 2. The duct 36 comprises a first portion 38 having radial orifices 39 opening into a channel 40 which is drilled obliquely in the body 2 starting from the upstream annular chamber 26. The duct 36 also comprises a second portion 41 which extends the first portion 38 in the direction of the actuating spindle 13 and whose diameter is smaller than that of the first portion 38. The second portion 41 has radial orifices 42 opening into the central volume accommodating the plug 6, this volume forming, when the valve 1 is in the closed and leaktight position, a downstream annular chamber 43 situated between the upstream seat 15 and the plug 6 and not communicating with the central passage 16 of the upstream seat 15.

Arranged substantially axially inside the duct 36 is a push rod 44 comprising a ball 45 whose diameter is sufficient to be able to obstruct the passage between the first portion 38 and the second portion 41 at the point where the cross section narrows. The push rod 44 is extended, beyond the ball 45, up to its free end, which forms a bearing face 46 situated opposite the actuating spindle 13. A spring 47 is mounted in the duct 36, around the push rod 44. The push rod 44 can move translationally along the axis 37 between:

- a closure position, toward which the push rod 44 is urged by the spring 47. In this closure position, the ball 45 obstructs the passage between the first portion 38 and the second portion 41 of the duct 36, the fluid then not being able to pass from the upstream annular chamber 26 to the downstream annular chamber 43. Furthermore, the push rod 44 projects from the duct 36 in the region of the actuating spindle 13, the bearing face 46 hence being situated outside the duct 36;
- and a release position, in which the push rod 44 is moved away from the actuating spindle 13. The spring 47 is then compressed and the bearing face 46 is in the vicinity of that end of the second portion 41 facing the actuating spindle 13. In this position, the passage between the first portion 38 and the second portion 41 of the duct 36 is no longer obstructed by the ball 45, the upstream 26 and downstream 43 annular chambers thus being in fluid communication.

The pressure-equalizing means comprise, moreover, a cam 48 formed by a curved part connected to the cap 60, itself fastened to the body 2 of the valve 1, the convex outer face 49 of which cam is arranged opposite the bearing face 46 of the push rod 44. The cam 48 comprises a first end which is fastened to the cap 60 such that it can rotate about an axis 50 substantially parallel to the pivoting axis 9 of the plug 6, and a second end to which there is fastened a roller 51 such that it can rotate about an axis 52 substantially parallel to the axis 50. The roller 51 is designed to cooperate, when the valve 1 is in the closed and leaktight position, with a cavity 53 formed in the actuating spindle 13. The cavity 53 is angularly separated from the axis 37 of the duct 36 by an angle β of around 20°.

Figure 4A:
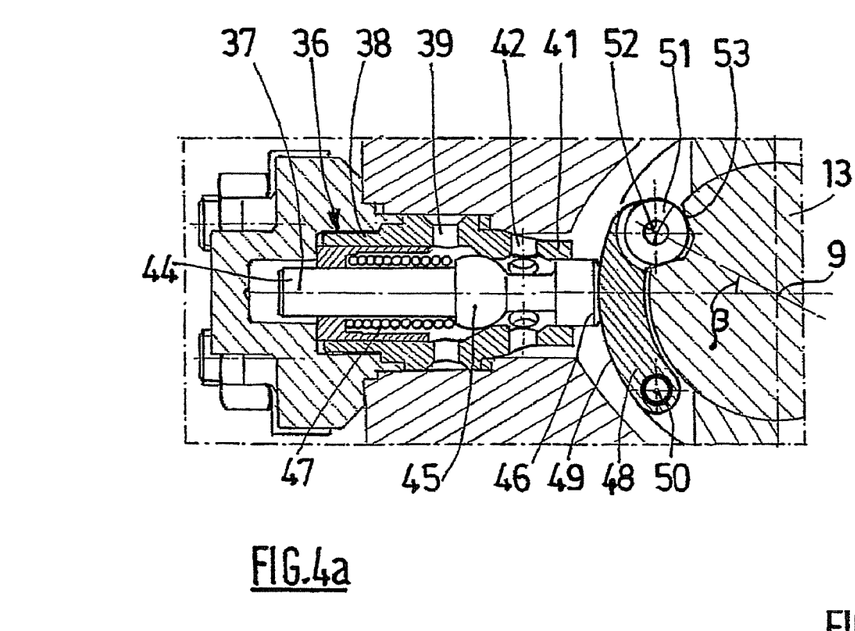
FIG. 4a is a view in section of the equalizing means, taken on line BB of FIG. 3, when the valve is in the closed and leaktight position.
Figure 4B:
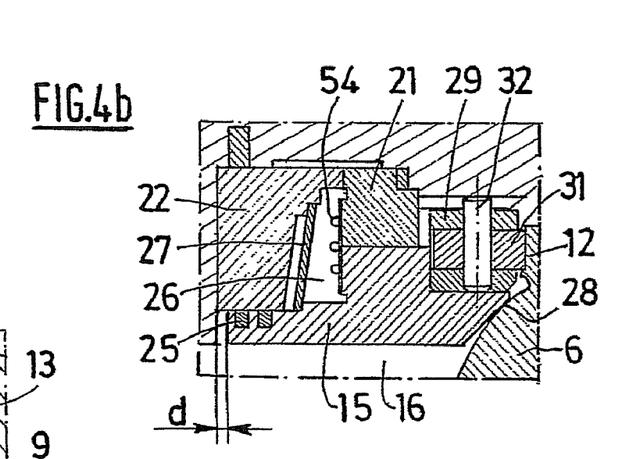
FIG. 4b is an enlarged view of a detail of FIG. 1, showing in part the upstream seat, the ring, the rollers and the plug, when the valve is in the closed and leaktight position.
Figure 4C:
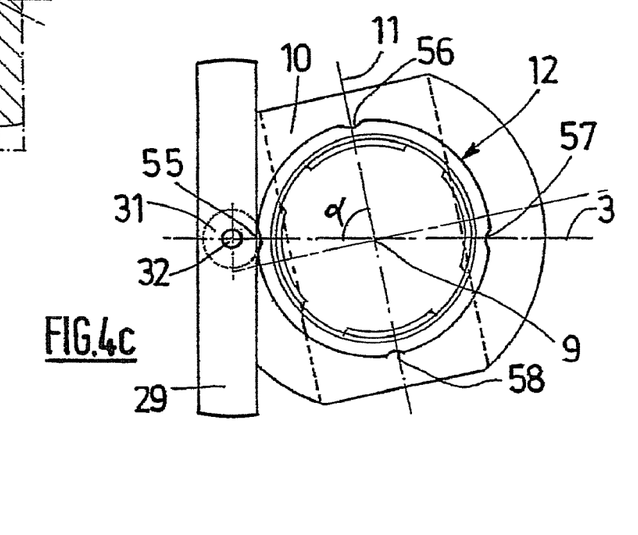
FIG. 4c is a plan view of the ring and the plug, when the valve is in the closed and leaktight position.

When the valve 1 is in the closed and leaktight position (FIGS. 4a, 4b, 4c), the plug 6 is arranged such that the axis 11 of its through orifice 10 forms an angle α of around 80° with the axis 3 of the channel of the body 2. The roller 31 of the ring 29 is then housed in the first recess 55 formed in the plug 6 (FIG. 4). Thus, owing to the action of the washer 27 and the pressure upstream, the upstream seat 15 is pressed against the plug 6 and the distance d between the upstream face of the closure element 22 and the upstream face of the upstream seat is at a maximum (FIG. 4b). The fact that the outside diameter of the fifth annular portion 59 of the upstream seat 15 is smaller than the outside diameter of the third annular portion 19 makes it possible to render the valve 1 leaktight by a pressure-sealing effect when the bypass is closed. Moreover, the roller 51 of the cam 48 is housed in the actuating spindle 13 of the plug 6 and the push rod 44 is in the closure position (FIG. 4a).

Figure 5:
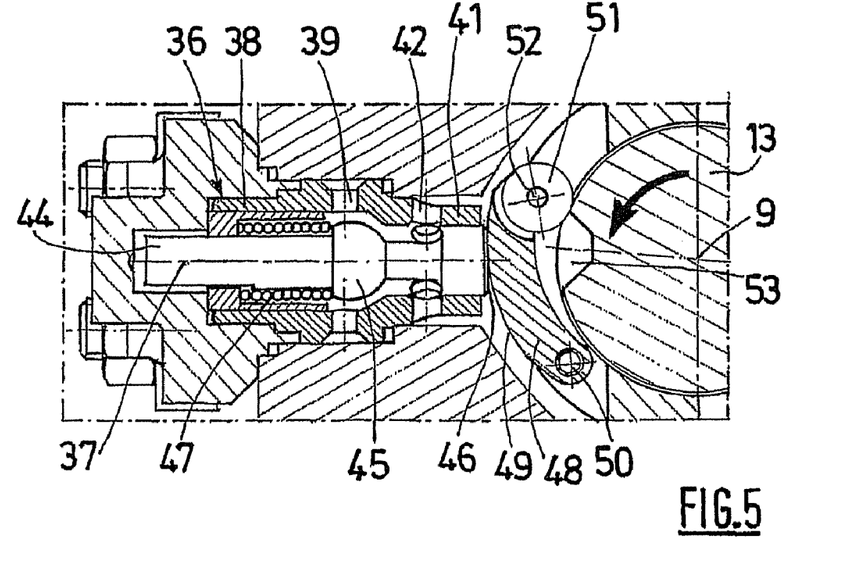
FIG. 5 is a view similar to FIG. 4a, the valve being in the pressure-equalizing position, and the plug being in the closed position.

When a user acts on the lever, he causes the actuating spindle 13 to pivot about the axis 9. The start of the pivoting movement of the actuating spindle 13 (pivoting of approximately 10° to 20°) does not result in any pivoting of the plug 6, on account of the play. The plug 6 hence remains in the closed position, as in FIG. 4c. However, the consequence of this pivoting is that the roller 51 of the cam 48 exits the cavity 53 (FIG. 5). The cam 48 thus pivots about the axis 50, causing the push rod 44 to move away from the actuating spindle 13, thereby releasing the passage between the first and second portions 38, 41 of the duct 36. The fluid can then pass from the upstream annular chamber 26 to the downstream annular chamber 43. There is thus equalization of the pressures on either side of the upstream seat 15 via the bypass circuit. The upstream seat 15 is thus now pushed toward the plug 6 only by the action of the washer 27. The valve 1 is in the pressure-equalizing position, and the plug 6 is still in the closed position. However, because the inside diameter of the fifth annular portion 59 of the upstream seat 15 is larger than the outside diameter of the first annular portion 17, there is a force opposing the force exerted by the washer 27, the effect of which is to reduce, or even eliminate, the action of this washer 27 and hence reduce the friction during the opening of the valve 1.

Figure 6A:
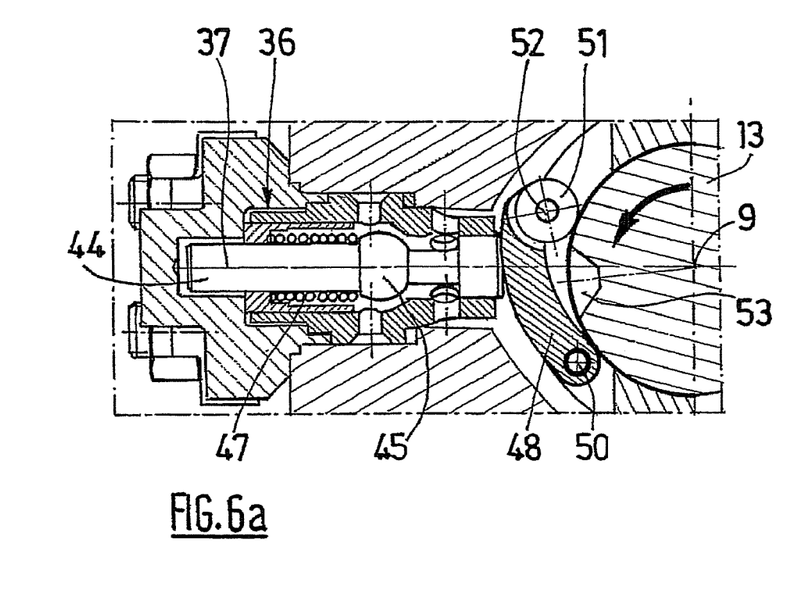
FIGS. 6a, 6b and 6c are views similar to FIGS. 4a, 4b and 4c, respectively, the valve being in the intermediate open position.
Figure 6B:
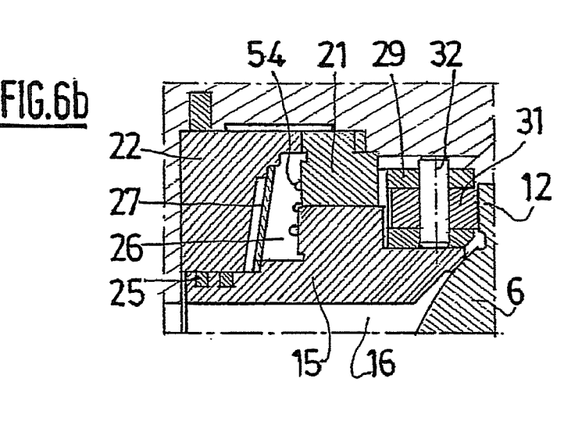
Figure 6C:
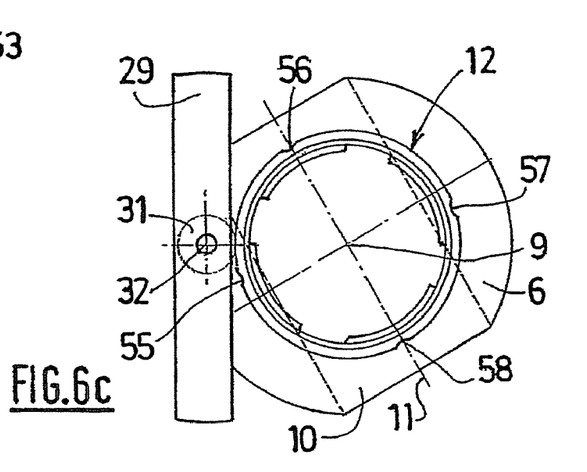

Further pivoting movement of the lever, and hence of the actuating spindle 13, causes the plug 6 to pivot, while the thrust force exerted by the upstream seat 15 owing to the upstream pressure has been eliminated. When the plug 6 pivots about the axis 9, the roller 31 of the ring 29 leaves the first recess 55 so as to roll against the lateral face of the cylindrical portion 12 of the plug 6. This is followed by a retreating movement of the upstream seat 15 with respect to the axis 9, against the force exerted by the washer 27. The distance d between the upstream face of the closure element 22 and the upstream face of the upstream seat is then minimal. The pivoting of the plug 6 is thus facilitated through the fact that the friction against the upstream seat 15 is largely reduced, since this friction is located only at the roller 31 and not over the whole contact area between the upstream seat 15 and the spherical part of the plug 6. The valve 1 is in the intermediate open position (FIGS. 6a, 6b, 6c).

Figure 7A:
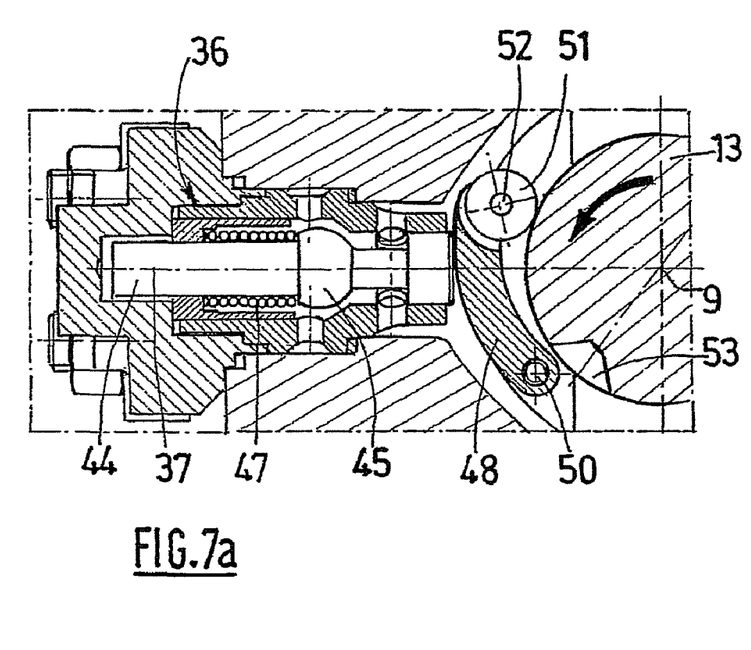
FIGS. 7a, 7b and 7c are views similar to FIGS. 4a, 4b and 4c, respectively, the valve being in the open position.
Figure 7B:
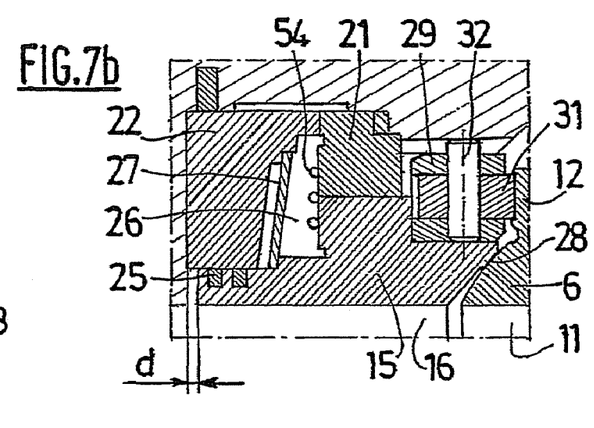
Figure 7C:
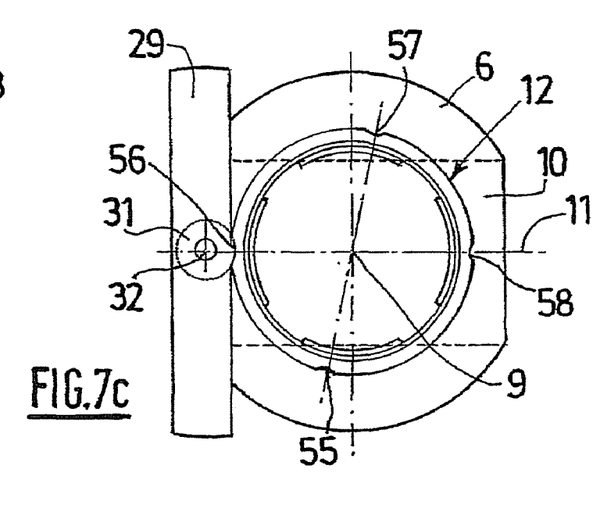

In the open position (FIGS. 7a, 7b, 7c), the roller 31 of the ring 29 is housed in the second recess 56, the upstream seat 15 thus being once again advanced toward the plug 6 and pressed against it (maximum distance d). The angle of rotation of the plug 6 is limited to a value of between 70° and 80° such that the total rotation of the lever remains 90°: thus, the invention can be used with standard actuators (pneumatic, electric or hydraulic actuators). The bypass circuit for its part is still open.

When the actuating spindle 13 is operated in the direction of closure, first of all the play is taken up and then the plug 6 is rotated about the axis 9, the bypass circuit still being open. When the plug 6 returns to the completely closed position, simultaneously with the end of rotation of the actuating spindle 13, the roller 31 of the ring 29 comes to be housed in the first recess 55 (maximum distance d) and the roller 51 of the cam 48 comes to be housed in the cavity 53. The push rod 44, under the effect of the spring 47, moves translationally toward the actuating spindle 13. The ball 45 then closes off the passage between the upstream annular chamber 26 and the downstream annular chamber 43. The pressure difference between the upstream end and the downstream end of the upstream seat 15 then contributes to pressing the latter against the plug 6.

Thus, the invention brings a decisive improvement over the prior art by providing a valve which is perfectly leaktight at low or medium pressure and which is easy to operate.

It goes without saying that the invention is not limited to the embodiment described above by way of example but that, on the contrary, it covers all the variant embodiments thereof.

The invention claimed is:

1. A valve comprising:
    a body in which there is formed a channel with an axis and which is intended to be placed between an upstream pipe and a downstream pipe;
    a substantially spherical rotating plug mounted in the body such that it can pivot about an axis substantially perpendicular to the axis of the channel, between a closed position and an open position, the plug having a through orifice with an axis that is intended to allow passage of fluid from the upstream pipe to the downstream pipe in the open position;
    an upstream seat having a central passage and mounted in the channel of the body upstream of the plug such that it can move translationally along the axis of the channel of the body;
    elastic means designed to urge the upstream seat toward the plug;
    at least one projection formed on the upstream seat and projecting substantially parallel to the axis of the channel of the body in a direction of the plug, and at least one first recess formed in the plug and designed to cooperate with the projection when the plug is in the closed position; and
    means for equalizing fluid pressure between the upstream end and the downstream end of the upstream seat, prior to the valve being opened;
    wherein the plug comprises a second recess situated substantially at the same distance as the first recess from a plane which is orthogonal to the pivoting axis of the plug and which passes through the axis of the through orifice, said second recess being designed to cooperate with the projection when the plug is in the open position; and
    wherein the second recess is situated substantially in the plane formed by the pivoting axis of the plug and the axis of the through orifice of the plug, the first recess being angularly separated from the second recess by an angle of between 70° and 80°.

2. Valve as claimed in claim 1, wherein the projection is formed by a roller rotatably mounted about an axis embodied by a pin secured to the upstream seat and substantially parallel to the pivoting axis of the plug.

3. Valve as claimed in claim 1, wherein the projection is formed on a ring fastened to the downstream part of the upstream seat so as to be substantially centered on the axis of the channel of the body, the first recess being formed on a cylindrical part which extends the spherical main part of the plug and whose axis is substantially coincident with the pivoting axis of the plug.

4. Valve as claimed in claim 3, wherein the roller is arranged in a housing formed in the ring.

5. Valve as claimed in claim 1, wherein the plug has at least two assemblies each comprising a first recess or first and second recesses, the two assemblies being substantially symmetrical to one another with respect to a plane which is orthogonal to the pivoting axis of the plug and which passes through the axis of the through orifice, and wherein the upstream seat has two projections which are substantially symmetrical with respect to the axis of the channel of the body and situated along a line substantially parallel to the pivoting axis of the plug, such that each projection can cooperate with the recess or recesses of one of the two assemblies.

6. Valve as claimed in claim 1, wherein the plug comprises at least two assemblies each comprising a first recess or first and second recesses, the two assemblies being substantially symmetrical to one another with respect to the pivoting axis of the plug.

7. Valve as claimed in claim 1, wherein the upstream seat comprises a plurality of successive annular portions from the upstream end toward the downstream end, dimensions of which are chosen such that, owing to the fluid pressure upstream and downstream of the upstream seat:
    when the pressure-equalizing means are in the closed position, the upstream seat is pressed against the plug, thus ensuring that the valve is leaktight;
    when the pressure-equalizing means are in the open position, a thrust force counter to the elastic means is exerted on the upstream seat.

8. Valve as claimed in one claim 1, wherein the pressure-equalizing means comprise:
    an upstream annular chamber whose downstream wall is formed by a shoulder formed on the upstream seat and facing upstream;
    a downstream annular chamber situated between the upstream seat and the plug, not communicating with the central passage of the upstream seat when the valve is in the closed and leaktight position;
    a duct with an axis that is formed in the body and has a first portion connected to the upstream annular chamber (26) by a channel and a second portion in communication with the downstream annular chamber;
    means for obstructing the passage between the first and second portions of the duct, which means are housed in said duct and can move translationally along the axis of the duct, said obstruction means being urged toward the closure position of said passage by elastic means and having a bearing face which, in the closure position of said passage, is situated outside the duct, in a region of the second portion thereof;
    a cam which, formed on the body between said obstruction means and a spindle which actuates the pivoting movement of the plug and is substantially coaxial with the pivoting axis of said plug, is able, when said actuating spindle is rotated, to cooperate with the bearing face and thus cause the obstruction means to move in the duct, counter to the force exerted by the elastic means and the pressure, toward a position of releasing the passage between the first and second portions of the duct.

9. A valve comprising:
    a body in which there is formed a channel with an axis and which is intended to be placed between an upstream pipe and a downstream pipe;
    a substantially spherical rotating plug mounted in the body such that it can pivot about an axis substantially perpendicular to the axis of the channel, between a closed position and an open position, the plug having a through orifice with an axis that is intended to allow passage of fluid from the upstream pipe to the downstream pipe in the open position;
    an upstream seat having a central passage and mounted in the channel of the body upstream of the plug such that it can move translationally along the axis of the channel of the body;
    elastic means designed to urge the upstream seat toward the plug;
    at least one projection formed on the upstream seat and projecting substantially parallel to the axis of the channel of the body in a direction of the plug and at least one first recess formed in the plug and designed to cooperate with the projection when the plug is in the closed position; and means for equalizing fluid pressure between the upstream end and the downstream end of the upstream seat, prior to the valve being opened;

wherein the pressure-equalizing means comprise:

an upstream annular chamber whose downstream wall is formed by a shoulder formed on the upstream seat and facing upstream;

a downstream annular chamber situated between the upstream seat and the plug, not communicating with the central passage of the upstream seat when the valve is in the closed and leaktight position;

a duct with an axis that is formed in the body and has a first portion connected to the upstream annular chamber (26) by a channel and a second portion in communication with the downstream annular chamber;

means for obstructing the passage between the first and second portions of the duct, which means are housed in said duct and can move translationally along the axis of the duct, said obstruction means being urged toward the closure position of said passage by elastic means and having a bearing face which, in the closure position of said passage, is situated outside the duct, in a region of the second portion thereof;

a cam which, formed on the body between said obstruction means and a spindle which actuates the pivoting movement of the plug and is substantially coaxial with the pivoting axis of said plug, is able, when said actuating spindle is rotated, to cooperate with the bearing face and thus cause the obstruction means to move in the duct, counter to the force exerted by the elastic means and the pressure, toward a position of releasing the passage between the first and second portions of the duct; and wherein the upstream annular chamber is in limited fluid communication with the central passage of the upstream seat via a radial clearance and rings arranged between the upstream seat and a closure element forming the upstream face of the upstream annular chamber.

10. A valve comprising:

a body in which there is formed a channel with an axis and which is intended to be placed between an upstream pipe and a downstream pipe;

a substantially spherical rotating plug mounted in the body such that it can pivot about an axis substantially perpendicular to the axis of the channel, between a closed position and an open position, the plug having a through orifice with an axis that is intended to allow passage of fluid from the upstream pipe to the downstream pipe in the open position;

an upstream seat having a central passage and mounted in the channel of the body upstream of the plug such that it can move translationally along the axis of the channel of the body;

elastic means designed to urge the upstream seat toward the plug;

at least one projection formed on the upstream seat and projecting substantially parallel to the axis of the channel of the body in a direction of the plug, and at least one first recess formed in the plug and designed to cooperate with the projection when the plug is in the closed position; and means for equalizing fluid pressure between the upstream end and the downstream end of the upstream seat, prior to the valve being opened;

wherein the pressure-equalizing means comprise:

an upstream annular chamber whose downstream wall is formed by a shoulder formed on the upstream seat and facing upstream;

a downstream annular chamber situated between the upstream seat and the plug, not communicating with the central passage of the upstream seat when the valve is in the closed and leaktight position;

a duct with an axis that is formed in the body and has a first portion connected to the upstream annular chamber (26) by a channel and a second portion in communication with the downstream annular chamber;

means for obstructing the passage between the first and second portions of the duct, which means are housed in said duct and can move translationally along the axis of the duct, said obstruction means being urged toward the closure position of said passage by elastic means and having a bearing face which, in the closure position of said passage, is situated outside the duct, in a region of the second portion thereof;

a cam which, formed on the body between said obstruction means and a spindle which actuates the pivoting movement of the plug and is substantially coaxial with the pivoting axis of said plug, is able, when said actuating spindle is rotated, to cooperate with the bearing face and thus cause the obstruction means to move in the duct, counter to the force exerted by the elastic means and the pressure, toward a position of releasing the passage between the first and second portions of the duct; and wherein the axis of the duct is substantially orthogonal to the pivoting axis of the plug, and the cam comprises a part situated opposite the bearing face of the obstruction means, a first end of which is fastened to the body of the valve such that it can pivot about an axis substantially parallel to the pivoting axis of the plug, and a second end of which has a projection projecting toward the actuating spindle of the plug, said projection being designed to cooperate, when the valve is in the closed and leaktight position, with a cavity formed in the actuating spindle.

* * * * *